US012285730B1

(12) United States Patent
Tsoi

(10) Patent No.: US 12,285,730 B1
(45) Date of Patent: Apr. 29, 2025

(54) MILK FROTHING HEAD AND FROTHER

(71) Applicant: SHENZHEN SEENDA TECHNOLOGY CO., LTD., Guangdong (CN)

(72) Inventor: Sai Hung Tsoi, Guangdong (CN)

(73) Assignee: SHENZHEN SEENDA TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/027,797

(22) Filed: Jan. 17, 2025

(30) Foreign Application Priority Data

Oct. 8, 2024 (CN) ......................... 202422427150.2

(51) Int. Cl.
*B01F 23/23* (2022.01)
*B01F 23/235* (2022.01)
*B01F 23/236* (2022.01)
*B01F 101/07* (2022.01)

(52) U.S. Cl.
CPC ........ *B01F 23/2351* (2022.01); *B01F 23/235* (2022.01); *B01F 23/236* (2022.01); *B01F 2101/07* (2022.01)

(58) Field of Classification Search
CPC ... B01F 23/235; B01F 23/2351; B01F 23/236
See application file for complete search history.

(56) References Cited

FOREIGN PATENT DOCUMENTS

| | | | | |
|---|---|---|---|---|
| CN | 209501553 U | * 10/2019 | | |
| EP | 2153885 A1 | * 2/2010 | .......... | A47J 43/0711 |
| TW | M644810 U | * 8/2023 | | |

* cited by examiner

*Primary Examiner* — Robert A Hopkins
(74) *Attorney, Agent, or Firm* — Daniel M. Cohn

(57) ABSTRACT

A milk frothing head and a frother are provided. The milk frothing head includes a first frothing frame and a second frothing frames detachably connected to the first frothing frame. A connecting rod configured to connect to an external power device is disposed on the first frothing frame. At least one filter screen of a ring shape is mounted between the first frothing frame and the second frothing frame. A head end of the at least one filter screen is connected to a tail end of the at least one filter screen. The first frothing frame defines a first through hole. The second frothing frame defines a second through hole corresponding to the first through hole. When the milk frothing head rotates, bubbles are divided into small bubbles by the at least one filter screen, and the small bubbles form delicate and dense milk foam with milk.

11 Claims, 13 Drawing Sheets

MILK FROTHING HEAD AND FROTHER

TECHNICAL FIELD

The present disclosure relates to a technical field of milk frothing, and in particular to a milk frothing head and a frother.

BACKGROUND

In the prior art, a filter-type milk frothing head is currently a most effective tool for frothing milk. A working principle of the filter-type milk frothing head is to stir milk through a fan blade and then pass the milk through a filter screen, thereby producing fine milk foam. However, due to a complex product structure of the filter-type milk frothing head, an interior of the filter-type milk frothing head is prone to accumulate milk residues, which are difficult to clean.

Therefore, how to provide a milk frothing head and a frother to simplify a structure of the milk frothing head has is a technical problem that needs to be solved urgently.

SUMMARY

Technical problem to be solved by the present disclosure is to provide a milk frothing head and a frother to simplify a structure of the milk frothing head.

In a first aspect, the present disclosure provides the milk frothing head. The milk frothing head comprises a first frothing frame and a second frothing frame. The first frothing frame is detachably connected to the second frothing frame. A connecting rod configured to connect to an external power device is disposed on one end of the first frothing frame. At least one filter screen is mounted between the first frothing frame and the second frothing frame. A head end of the at least one filter screen is connected to a tail end of the at least one filter screen. The at least one filter screen is of a ring shape. The first frothing frame defines a first through hole. The second frothing frame defines a second through hole corresponding to the first through hole.

Furthermore, an inner diameter of an upper opening of the at least one filter screen is equal to an inner diameter of a lower opening of the at least one filter screen, or the inner diameter of the upper opening of the at least one filter screen is greater than the inner diameter of the lower opening of the at least one filter screen.

Furthermore, at least one first frothing block is disposed on the first frothing frame. At least one second frothing block is disposed on the second frothing frame. The at least one first frothing block and the at least one second frothing block are configured to refine milk foam.

Furthermore, the at least one filter screen is made of stainless steel.

Furthermore, the head end of the at least one filter screen is welded to the tail end of the at least one filter screen.

Furthermore, a first positioning sheet is disposed on the at least one filter screen, and a first positioning groove matched with the first positioning sheet is defined in the first frothing frame or the second frothing frame.

Furthermore, at least one second positioning sheet is disposed on the at least one filter screen. The at least one second positioning sheet is disposed opposite to the first positioning sheet. A second positioning groove matched with the at least one second positioning sheet is defined in the first frothing frame or the second frothing frame.

Furthermore, the at least one filter screen comprises filter screens. The filter screens are disposed layer by layer in a direction from an inside to an outside of the milk frothing head.

In a second aspect, the present disclosure provides the frother. The frother comprises a frothing motor, a transmission shaft, and the milk frothing head disclosed in the first aspect. A first end of the transmission shaft is connected to the connecting rod. A second end of the transmission shaft is connected to an output shaft of the frothing motor.

Furthermore, the transmission shaft is a hollow shaft, and a shock absorber configured to reduce vibration of the transmission shaft is mounted in the transmission shaft.

The at least one filter screen is mounted between the first frothing frame and the second frothing frame, so when the milk frothing head rotates, bubbles are divided into small bubbles by the at least one filter screen, and the small bubbles form delicate and dense milk foam with milk. In the milk frothing head of the present disclosure, there is no need to provide an impeller structure, which reduces a risk of excessive air intake, so the milk frothing head has a simple simplified overall and is easy to clean.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

Figure 1:
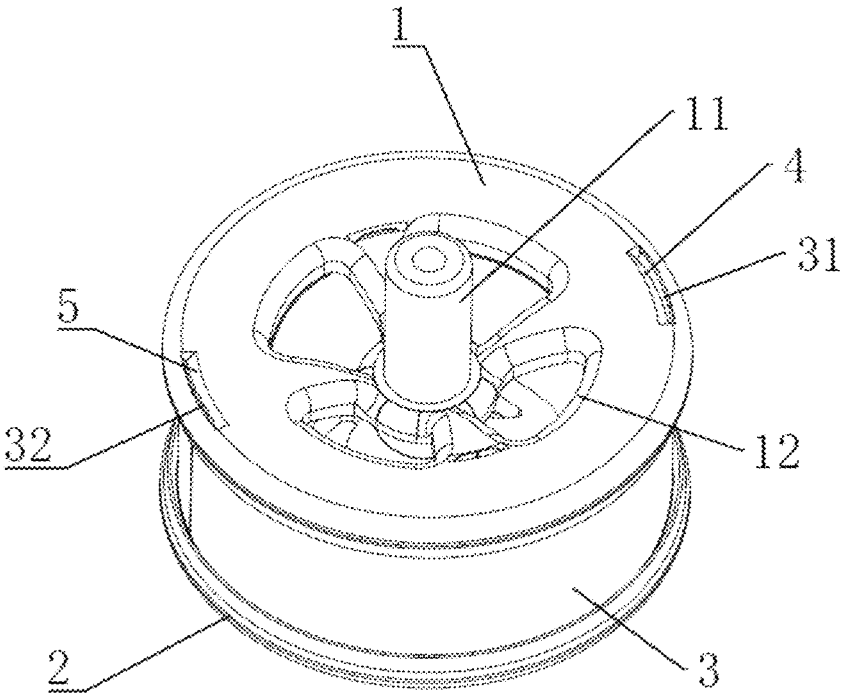
FIG. 1 is a perspective schematic diagram of a milk frothing head according to a first embodiment of the present disclosure.
Figure 2:
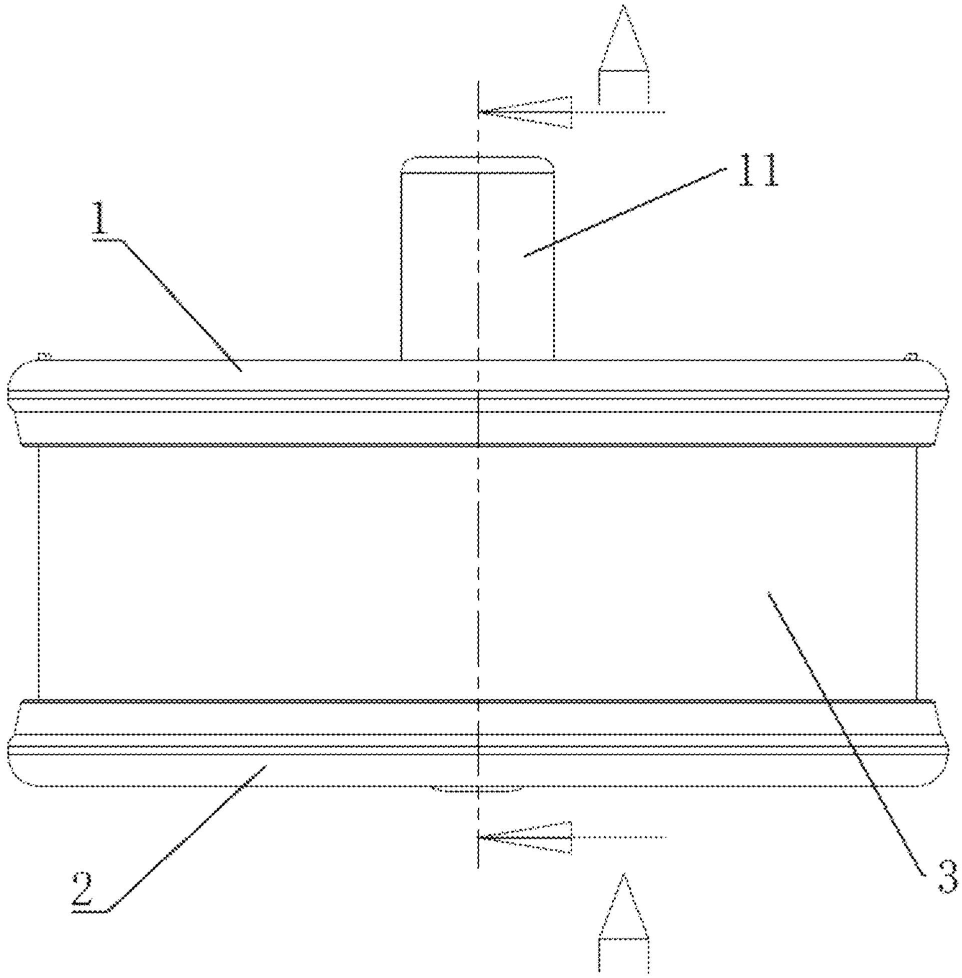
FIG. 2 is a side elevational schematic diagram of the milk frothing head according to the first embodiment of the present disclosure.

Reference numerals: 1—first frothing frame; 11—connecting rod; 12—first through hole; 13—inserting rod; 131—first flat surface; 14—first frothing block; 2—second frothing frame; 21—second through hole; 22—clamping groove; 221—second flat surface; 23—second frothing block; 3—filter screen; 31—first positioning sheet; 32—second positioning sheet; 4—first positioning groove; 5—second positioning groove; 6—transmission shaft; 7—shock absorber.

DETAILED DESCRIPTION

In order to make objectives, technical solutions, and advantages of the present disclosure clearer, the following further describes the present disclosure in detail with reference to accompanying drawings and embodiments. It should be understood that the specific embodiments described here are only used to explain the present disclosure, but not to limit the present disclosure.

It should be noted in the description of the present disclosure that, unless otherwise regulated and defined, terms such as "installation," "bonded," and "connection" shall be understood in broad sense, and for example, may refer to fixed connection or detachable connection or integral connection; may refer to mechanical connection or electrical connection; may refer to direct connection or indirect connection through an intermediate medium or inner communication of two elements, and may refer to wired connection or wireless connection. For those of ordinary skill in the art, the meanings of the above terms in the present disclosure may be understood according to concrete conditions.

It should be noted that in the description of the present disclosure terms such as "central", "horizontal", "upper", "lower", "left", "right", "vertical", "horizontal", "top", "bottom", "inner", "outer", etc., indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, terms such as "first", "second", and "third" are only used for the purpose of description, rather than being understood to indicate or imply relative importance.

In addition, technical features involved in the different embodiments of the present disclosure described below can be combined with each other as long as they do not conflict with each other.

In a first aspect, the present disclosure provides a milk frothing head. As shown in FIGS. 1-11, the milk frothing head comprises a first frothing frame 1 and a second frothing frame 2. The first frothing frame 1 is detachably connected to the second frothing frame 2. A connecting rod 11 configured to connect to an external power device is disposed on one end of the first frothing frame 1. At least one filter screen 3 is mounted between the first frothing frame 1 and the second frothing frame 2. A head end of the at least one filter screen 3 is connected to a tail end of the at least one filter screen 3. The at least one filter screen 3 is of a ring shape. The first frothing frame 1 defines a first through hole 12. The second frothing frame 2 defines a second through hole 21 corresponding to the first through hole 12.

In the embodiment, the first frothing frame 1 comprises an inserting rod 13 disposed on one end opposite to the connecting rod 11, and the second frothing frame 2 defines a clamping groove 22. The inserting rod 13 is inserted into the clamping groove 22 and is matched with the clamping groove 22, and the inserting rod 13 passes through the clamping groove 22. An outer wall of the inserting rod 13 has a first flat surface 131, and the clamping groove 22 has a second flat surface 221 attached to the first flat surface 131 of the inserting rod 13. Through configurations of the first flat surface 131 of the inserting rod 13 and the second flat surface 221 of the clamping groove 22, the first frothing frame 1 is enabled to drive the second frothing frame 2 to rotate synchronously.

It is noted that the at least one filter screen 3 is mounted between the first frothing frame 1 and the second frothing frame 2, so when the milk frothing head rotates, bubbles are divided into small bubbles by the at least one filter screen 3, and the small bubbles form delicate and dense milk foam with milk. In the milk frothing head of the present disclosure, there is no need to provide an impeller structure, which reduces a risk of excessive air intake, so the milk frothing head has a simple simplified overall and is easy to clean.

Figure 3:
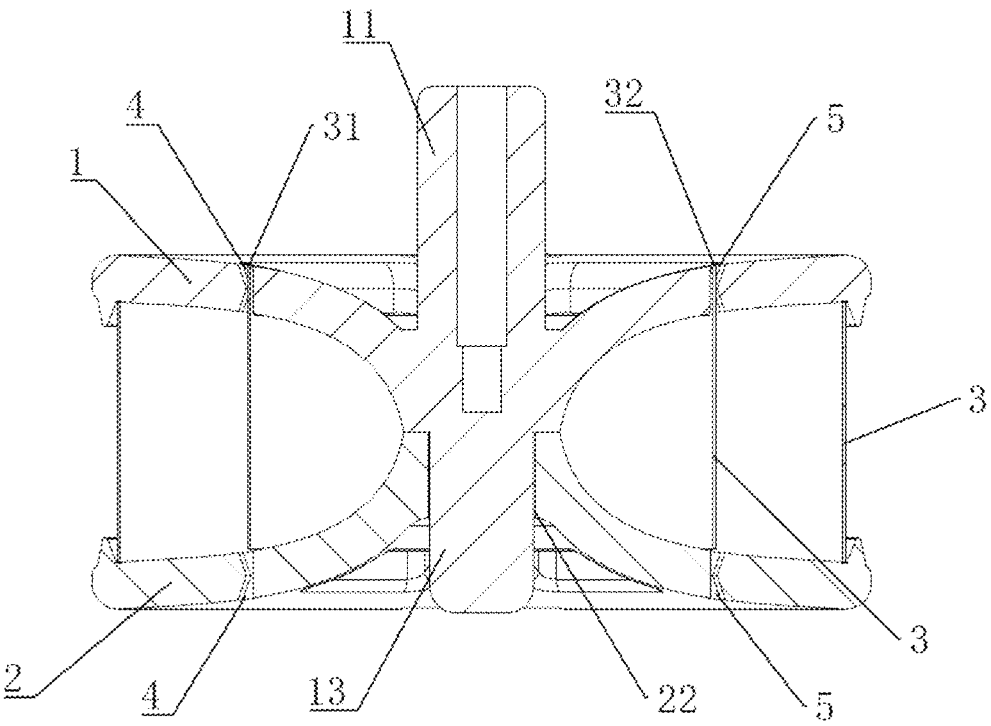
FIG. 3 is a cross-sectional schematic diagram of the milk frothing head taken along a line A-A shown in FIG. 2.

As shown in FIG. 3, an inner diameter of an upper opening of the at least one filter screen 3 is equal to an inner diameter of a lower opening of the at least one filter screen 3. It should be noted that, since the at least one filter screen 3 is placed vertically. Compared with a filter screen in the prior art that is disposed perpendicular to an axial position of the milk frothing head, the at least one filter screen 3 is changed to be parallel to the axial position of the milk frothing head, thereby increasing an area of the at least one filter screen 3. Thus, more air and milk are allowed to quickly pass through the at least one filter screen 3 to form milk foam, thereby effectively increasing production efficiency of the milk foam.

Figure 9:
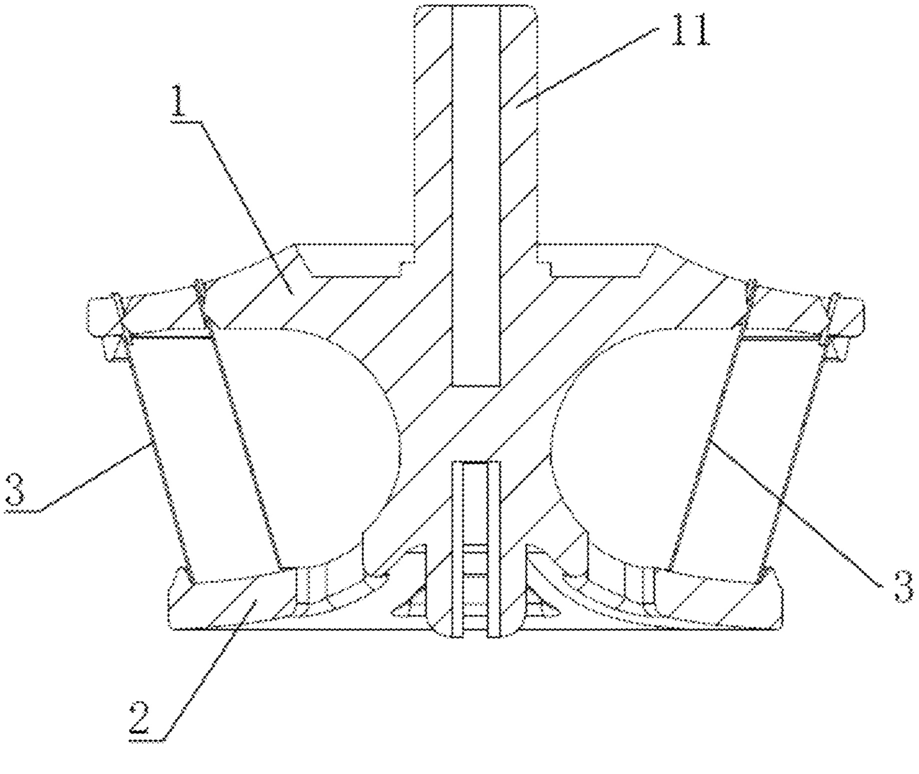
FIG. 9 is a cross-sectional schematic diagram of the milk frothing head taken along a line B-B shown in FIG. 8.
Figure 12:
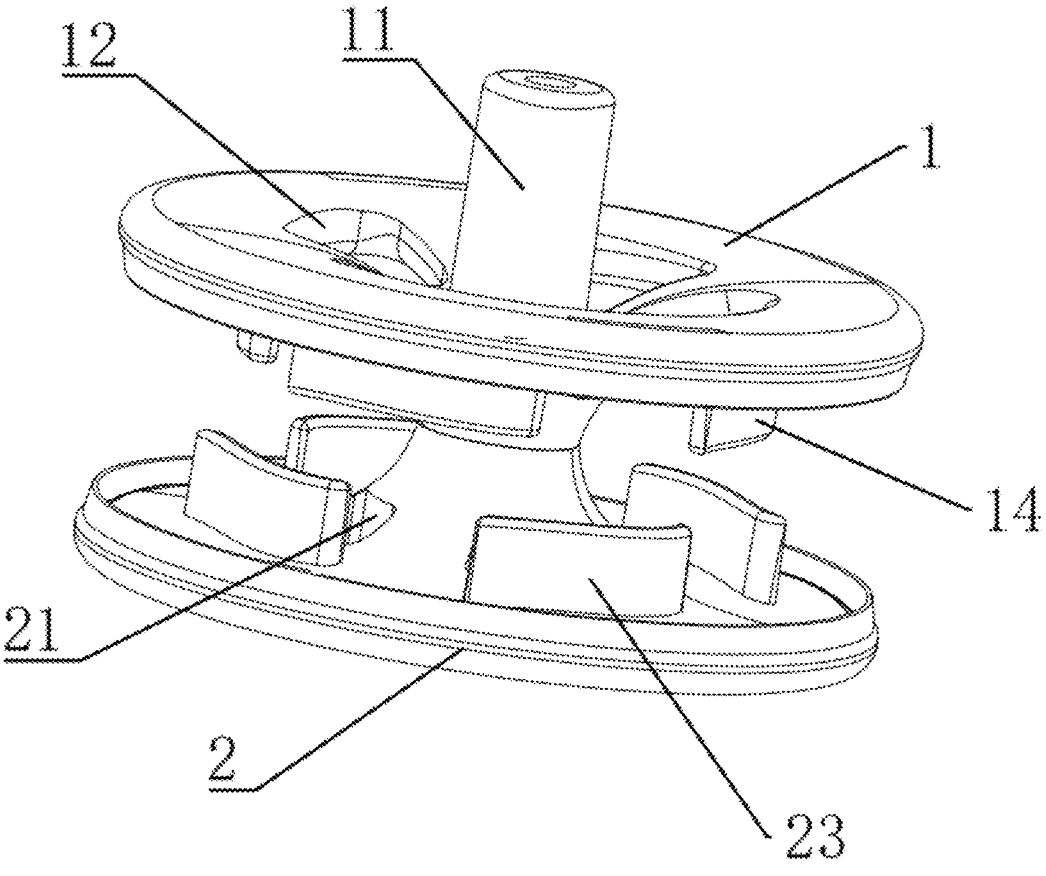
FIG. 12 is a partial schematic diagram of the milk frothing head according to a third embodiment of the present disclosure.
Figure 13:
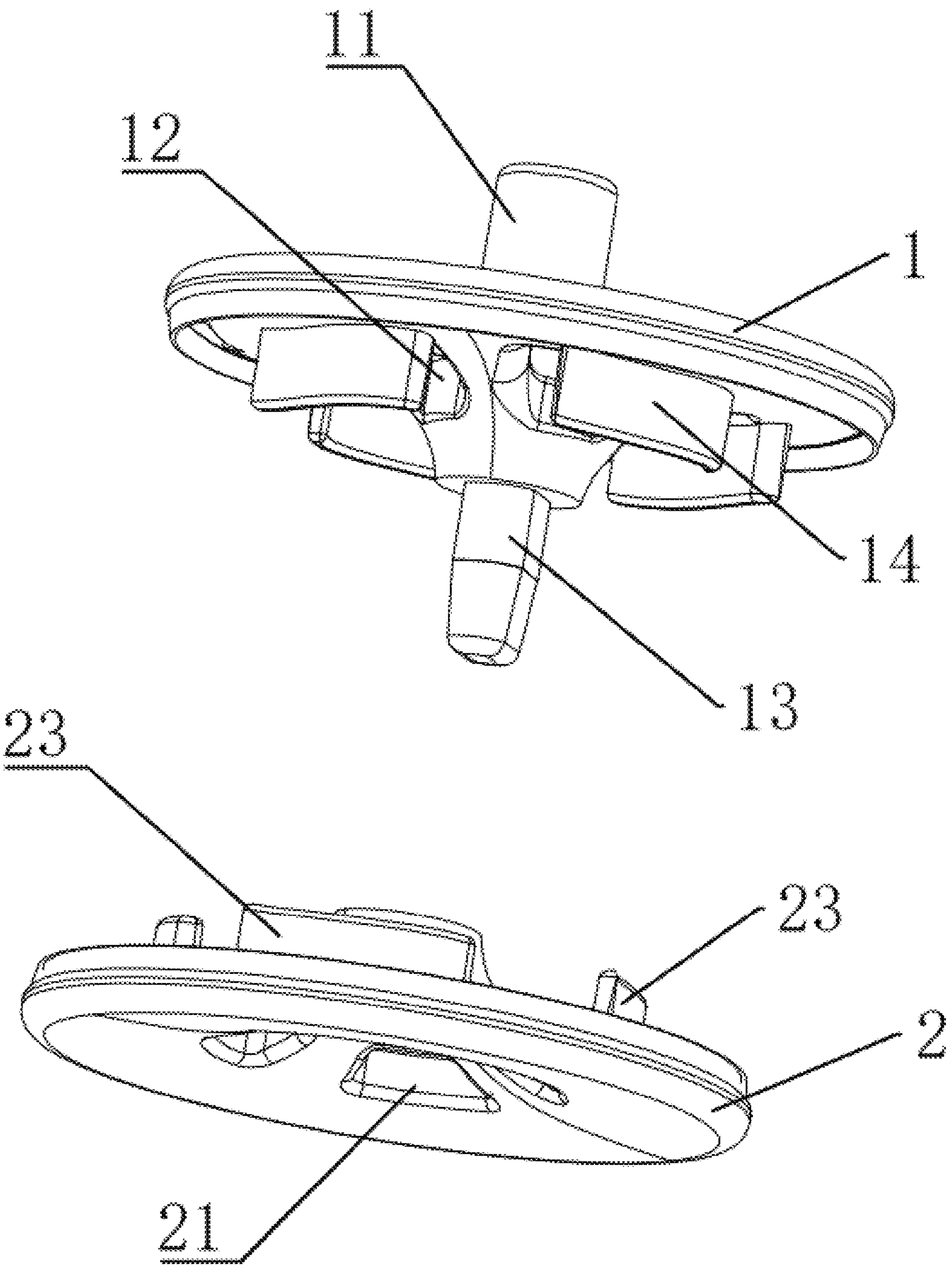
FIG. 13 is an exploded partial schematic diagram of the milk frothing head according to the third embodiment of the present disclosure.

Alternatively, as shown in FIG. 9, the inner diameter of the upper opening of the at least one filter screen 3 is greater than the inner diameter of the lower opening of the at least one filter screen 3. Since the inner diameter of the upper opening of the at least one filter screen 3 is greater than the inner diameter of the lower opening of the at least one filter screen 3, the area of the at least one filter screen 3 increases and more air and milk are allowed to quickly pass through the at least one filter screen 3 to form milk foam, thereby effectively increasing production efficiency of the milk foam. Further, the at least one filter screen 3 is prevented from collision with a bottom of a milk storage container As shown in FIGS. 12-13, first frothing blocks 14 are disposed on the first frothing frame 1. Second frothing blocks 23 are disposed on the second frothing frame 2. In the embodiment, the first frothing frame 1 and the first frothing blocks 14 are integrally formed, and the second frothing frame 2 and the second frothing blocks 23 are integrally formed. By such configurations, structural strengths of connection positions thereof are improved connection points, an overall structural strength and durability of the milk frothing head are enhanced, and the milk frothing head is not damaged or deformed due to insufficient strength during high-speed rotation. Moreover, the increase in structural strength and a reduction in vibration further make the milk frothing head more stable and quiet during use, which enhances a user experience.

The first frothing blocks 14 and the second frothing blocks 23 are configured to refine the milk foam. In the embodiment, four first frothing blocks 14 and four second frothing blocks 23 are provided. The four first frothing blocks 14 are evenly spaced along a circumference of the first frothing frame 1, and the four second frothing blocks 23 are evenly spaced along a circumference of the second frothing frame 2. The four first frothing blocks 14 and the four second frothing blocks 23 are curved blocks. Since the four first frothing blocks 14 are evenly spaced along the circumference of the first frothing frame 1, and the four second frothing blocks 23 are evenly spaced along the circumference of the second frothing frame 2. Symmetry and uniform distribution of the four first frothing blocks 14 and the four second frothing blocks 23 avoid vibration and eccentricity caused by uneven mass distribution during rotation, thereby making a frothing process smoother and more efficient.

It should be noted that the four first frothing blocks 14 and the four second frothing blocks 23 are configured to efficiently froth the milk, so that the bubbles are fully divided, and the milk and the bubbles are better mixed to form fine and dense milk foam. The first frothing blocks 14 and the second frothing block 23 are the curved blocks, which avoid turbulence that affects a flow path of the milk, avoid shaking, increase a surface contact area with the milk, and improve the efficiency of milk foam refinement. By refining the milk foam through curved blocks, quality of the milk foam is significantly improved, and the frothed milk foam is more uniform and delicate, meeting a user demand of for high-quality milk foam.

It should be noted that surfaces of the first frothing blocks 14 and surfaces of the second frothing blocks 23 are designed to be curved. When the milk frothing head rotates at a high speed, the milk and the bubbles generate friction with the surfaces of the first frothing blocks 14 and the surfaces of the second frothing blocks 23 when flowing through the surfaces. The curve blocks increase a contact area of the milk frothing head with the milk, making a friction effect more significant, and effectively improving an ability to divide and refine the bubbles. During a rotation process, the friction divides and disturbs the bubbles, so that large bubbles are further broken up into smaller bubbles, and the smaller bubbles are fully mixed with the milk to form denser milk foam. The first frothing blocks 14 and the second frothing blocks 23 are respectively disposed along the circumference of the first frothing frame and the circumference of the second frothing frame. During the rotation process, a centrifugal force forces the milk and the bubbles to rotate at a high speed and flow through the surfaces of the first frothing blocks 14 and the surfaces of the second frothing blocks 23 and holes of the at least one filter screen 3. Under a synergistic effect of the centrifugal force and the friction, a bubble refinement effect is further enhanced and production efficiency of the milk foam is accelerated. The synergistic effect of the friction and the centrifugal force further improves frothing efficiency of the milk foam head, while ensuring that the quality of the milk foam is more stable and consistent.

In summary, the friction generated between the milk and the first frothing blocks 14 and the second frothing blocks 23 cooperates with the centrifugal force generated by rotation to achieve an efficient, stable and delicate milk foam refinement effect, while improving the structural strength of the milk frothing head and the user experience.

Figure 4:
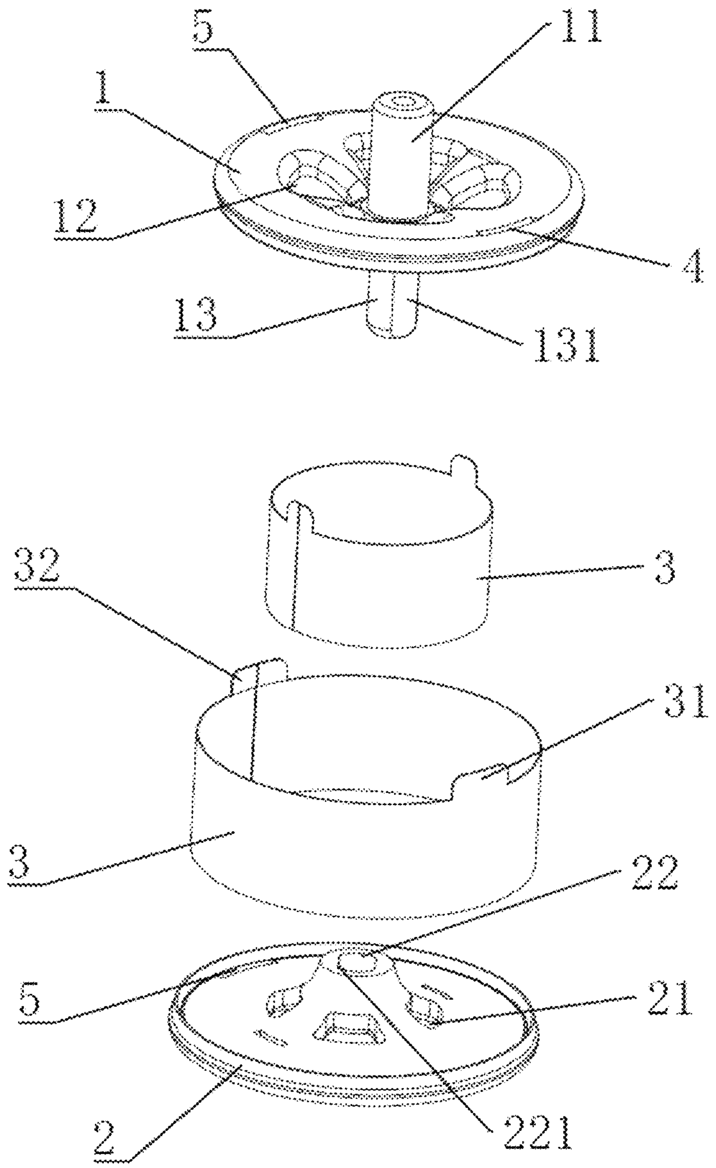
FIG. 4 is an exploded schematic diagram of the milk frothing head according to the first embodiment of the present disclosure.

As shown in FIG. 4, the at least one filter screen 3 is made of stainless steel. In a specific manufacturing process, the at least one filter screen 3 is made by etching holes on a complete thin metal sheet. Compared with a conventional woven mesh structure, the at least one filter screen 3 has no gaps and is more convenient to clean.

As shown in FIG. 4, the head end of the at least one filter screen 3 is welded to the tail end of the at least one filter screen 3. It should be noted that, since the head end of the at least one filter screen 3 is welded to the tail end of the at least one filter screen 3, a structure of the at least one filter screen 3 is more stable.

Figure 5:
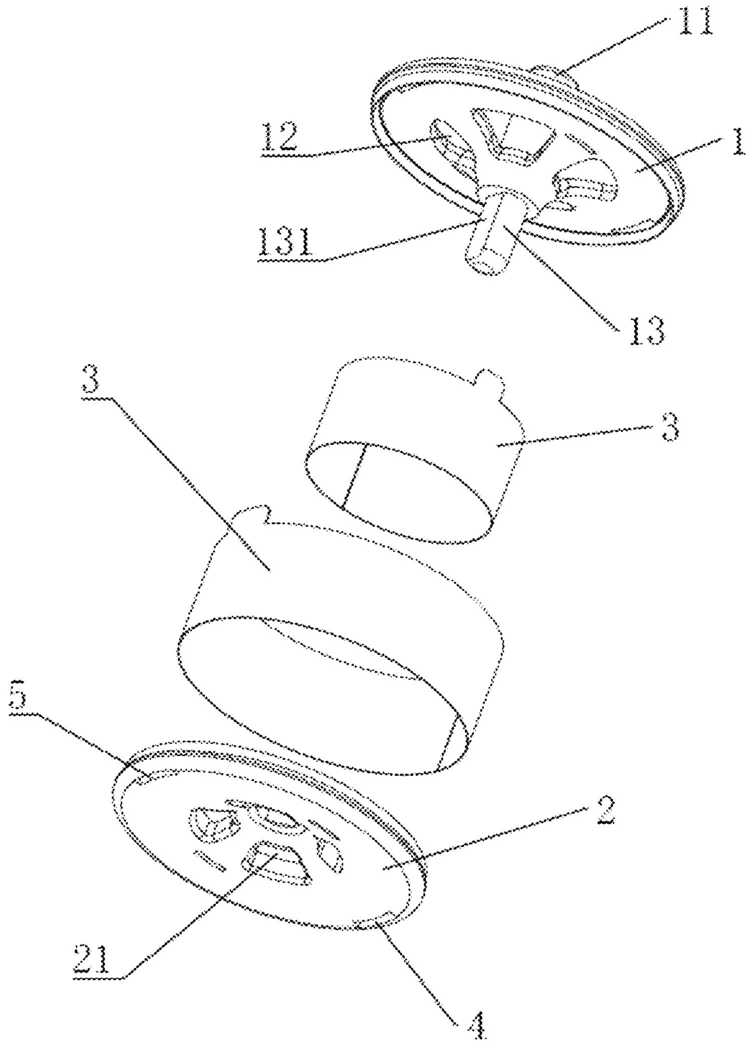
FIG. 5 is another exploded schematic diagram of the milk frothing head according to the first embodiment of the present disclosure.
Figure 6:
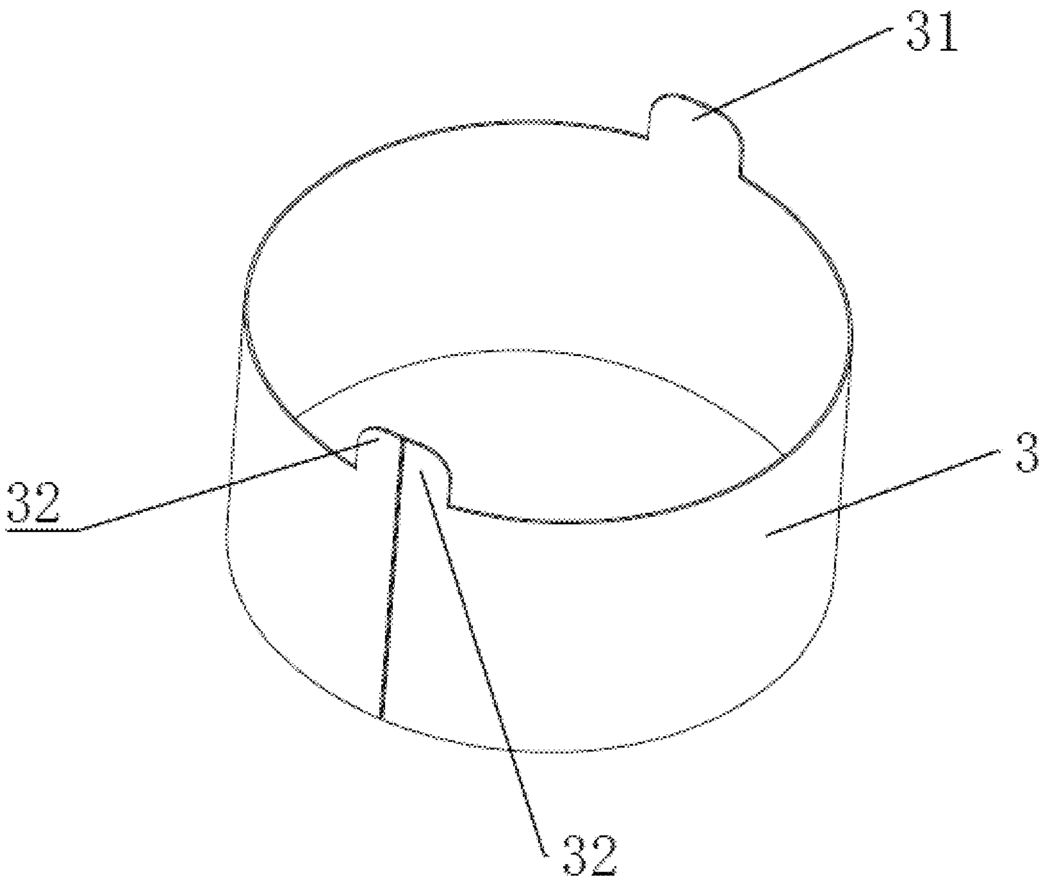
FIG. 6 is a schematic diagram of a first embodiment of a filter screen of the milk frothing head of the present disclosure.
Figure 7:
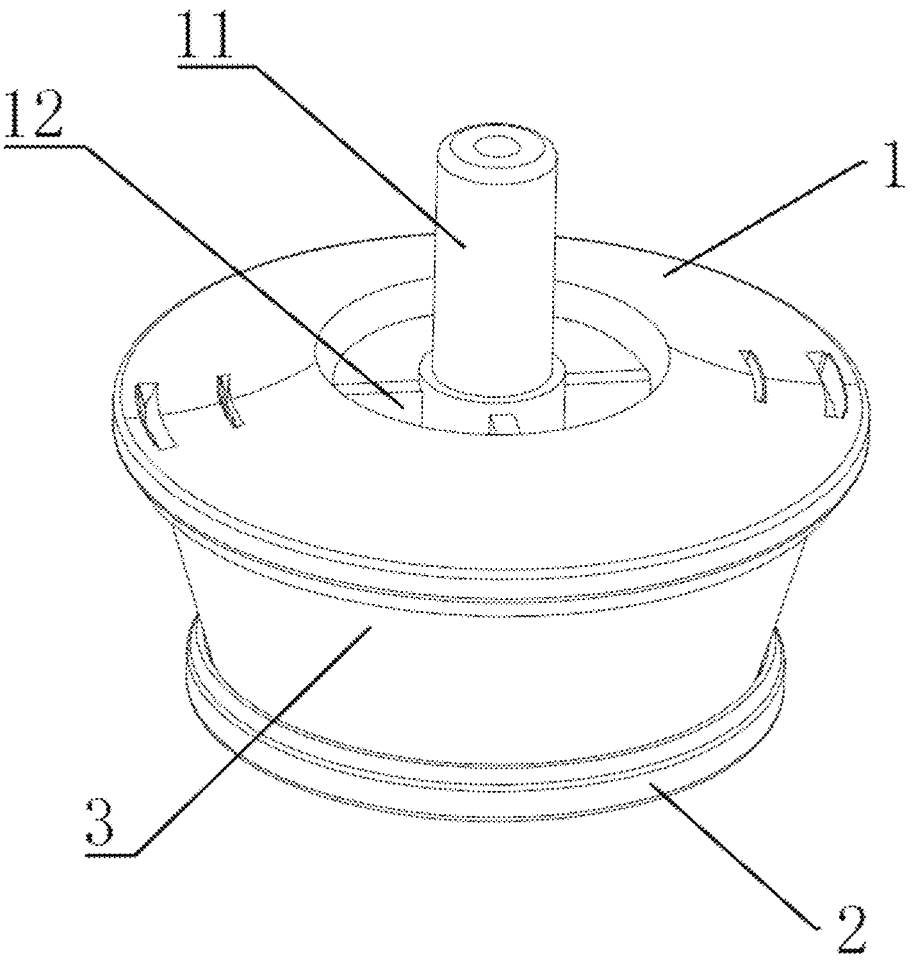
FIG. 7 is a schematic diagram of a second embodiment of the filter screen of the milk frothing head of the present disclosure.
Figure 8:
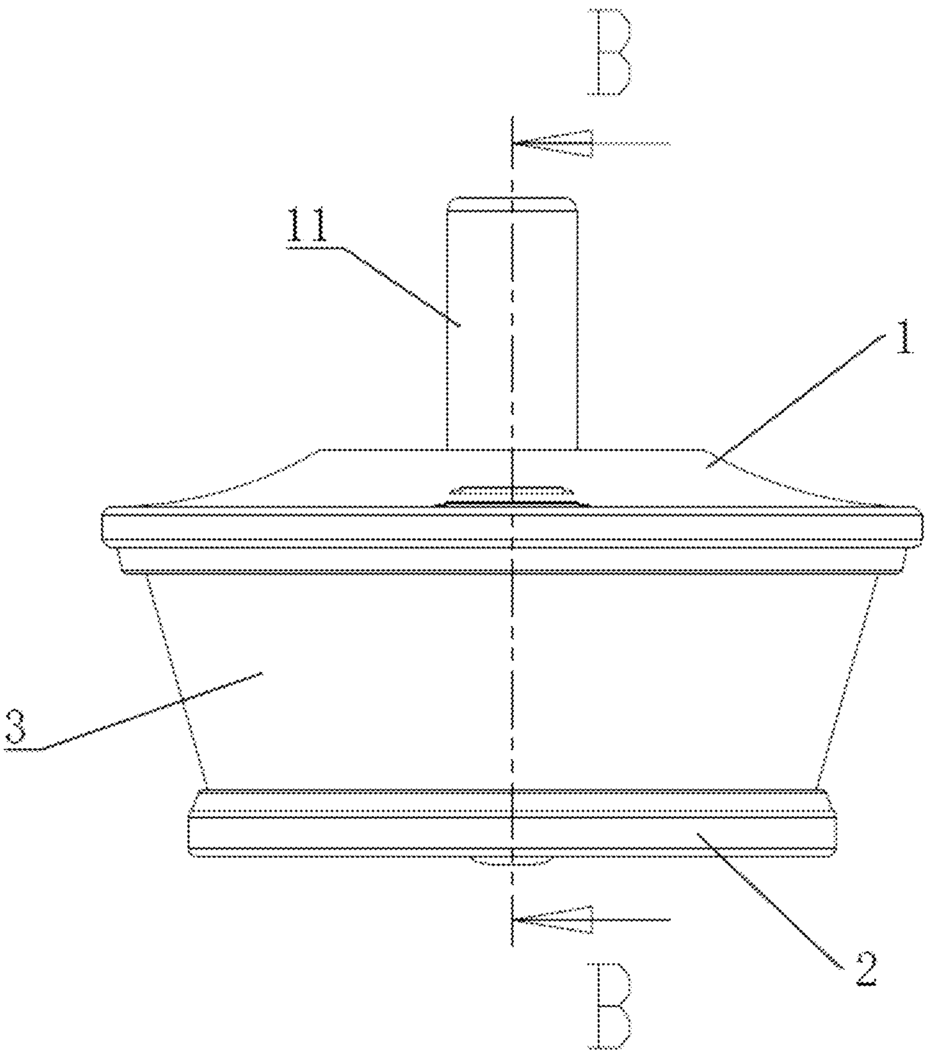
FIG. 8 is a side elevational schematic diagram of the milk frothing head according to a second embodiment of the present disclosure.

As shown in FIGS. 4-6, a first positioning sheet 31 is disposed on the at least one filter screen 3, and a first positioning groove 4 matched with the first positioning sheet 31 is defined in the first frothing frame 1 or the second frothing frame 2. It should be noted that the first positioning sheet 31 and the at least one filter screen 3 are integrally formed, and the at least one filter screen 3 is positioned and mounted through a positioning cooperation between the first positioning sheet 31 and the first positioning groove 4.

As shown in FIGS. 4-6, at least one second positioning sheet 32 is disposed on the at least one filter screen 3. The at least one second positioning sheet 32 is disposed opposite to the first positioning sheet 31. A second positioning groove 5 matched with the at least one second positioning sheet 32 is defined in the first frothing frame 1 or the second frothing frame 2. It should be noted that the at least one second positioning sheet 32 and the at least one filter screen 3 are integrally formed, and the at least one filter screen 3 is positioned and mounted through a positioning cooperation between the at least one second positioning sheet 32 and the second positioning groove 5. In a specific implementation process, the first positioning sheet 31 is disposed on a middle portion of one side of the at least one filter screen 3, the at least second positioning sheet 32 comprises two second positioning sheets 32, and the two second positioning sheets 32 are respectively disposed on the head end and the tail end of the at least one filter screen.

As shown in FIGS. 1-11, the at least one filter screen 3 comprises filter screens 3. The filter screens 3 are disposed layer by layer in a direction from an inside to an outside of the milk frothing head. It should be noted that when the filter screens 3 rotate at a high speed, a strong centrifugal force is generated in the milk, forcing the milk and the bubbles to pass through the holes of the filter screen 3. Then, the bubbles are divided into smaller bubbles and mixed with the milk, so as to form the fine and dense milk foam.

Figure 10:
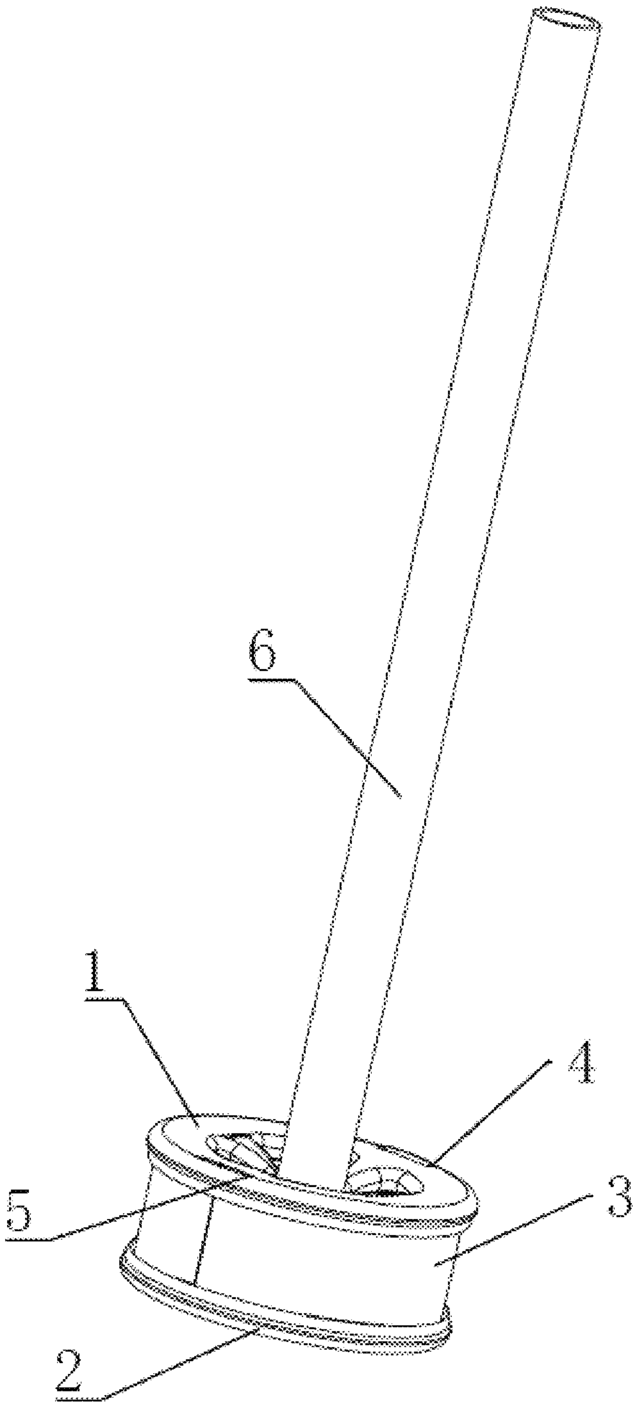
FIG. 10 is a partial schematic diagram of a frother according to one embodiment of the present disclosure.
Figure 11:
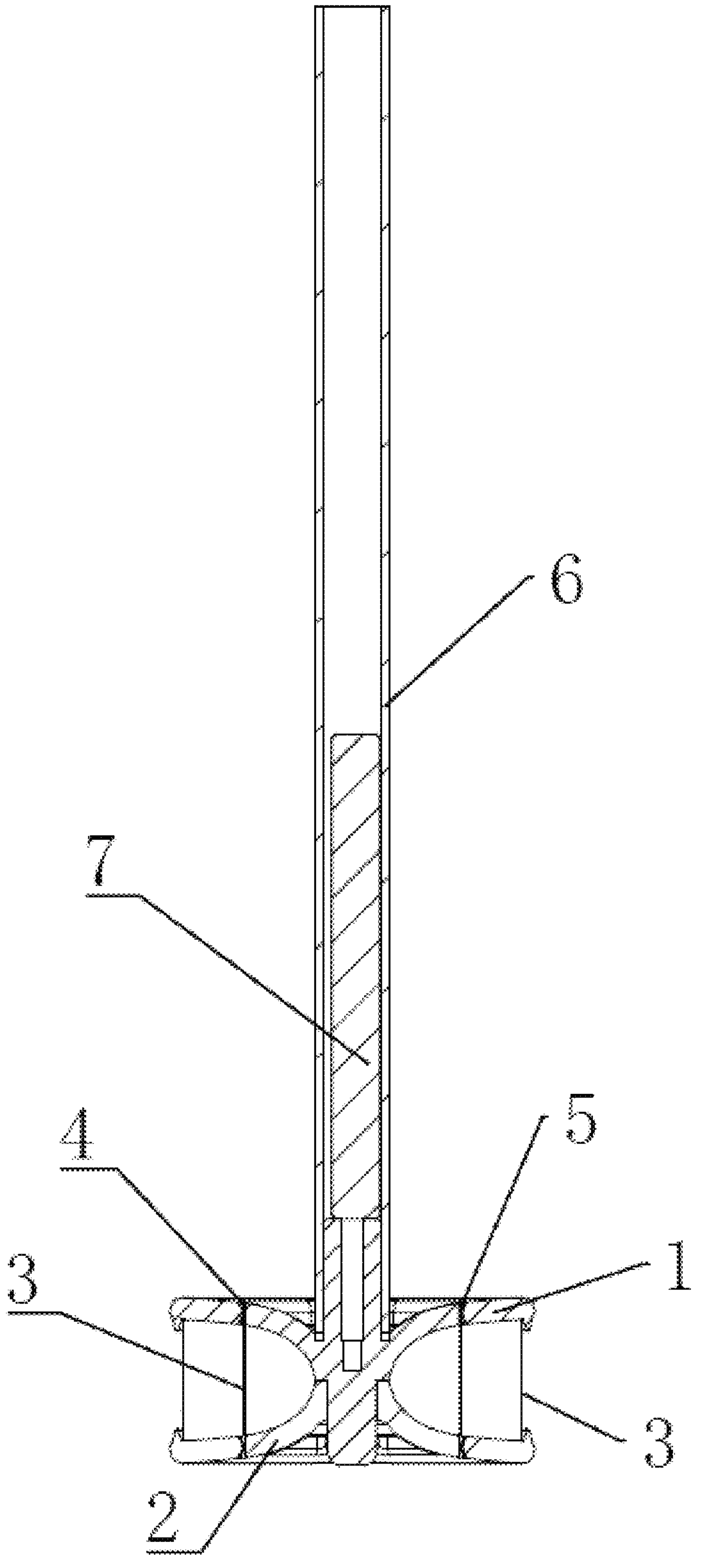
FIG. 11 is a partial cross-sectional schematic diagram of the frother according to one embodiment of the present disclosure.

In a second aspect, the present disclosure provides a frother. As shown in FIGS. 10-11, the frother comprises a frothing motor, a transmission shaft 6, and the milk frothing head disclosed in the first aspect. A first end of the transmission shaft 6 is connected to the connecting rod 11. A second end of the transmission shaft 6 is connected to an output shaft of the frothing motor.

As shown in FIGS. 10-11, the transmission shaft 6 is a hollow shaft, and a shock absorber 7 configured to reduce vibration of the transmission shaft 6 is mounted in the transmission shaft 6. In the embodiment, the shock absorber 7 is a counterweight. By configuration of the counterweight, due to different rotation speeds of the transmission shaft 6 and the counterweight in an initial stage of the rotation process, the counterweight and the transmission shaft 6 may collide to offset resonance of the transmission shaft 6, thereby reducing the vibration and enhancing the user experience.

Obviously, the above embodiments are merely examples for purposes of clear explanation of the present disclosure, and are not intended to limit implementation methods of the present disclosure. For those skilled in the art, other different forms of changes or modifications can be made based on the above description. It is not necessary and impossible to list all the implementation methods herein. Obvious changes or modifications derived therefrom should fall within the protection scope of the present disclosure.

What is claimed is:

1. A milk frothing head, comprising:

a first frothing frame; and a second frothing frame;

wherein the first frothing frame is detachably connected to the second frothing frame, a connecting rod configured to connect to an external power device is disposed on one end of the first frothing frame, at least one filter screen is mounted between the first frothing frame and the second frothing frame, a head end of the at least one filter screen is connected to a tail end of the at least one filter screen, the at least one filter screen is of a ring shape, the first frothing frame defines a first through hole, and the second frothing frame defines a second through hole corresponding to the first through hole.

2. The milk frothing head according to claim 1, wherein an inner diameter of an upper opening of the at least one filter screen is equal to an inner diameter of a lower opening of the at least one filter screen, or the inner diameter of the upper opening of the at least one filter screen is greater than the inner diameter of the lower opening of the at least one filter screen.

3. The milk frothing head according to claim 1, wherein at least one first frothing block is disposed on the first frothing frame, at least one second frothing block is disposed on the second frothing frame, and the at least one first frothing block and the at least one second frothing block are configured to refine milk foam.

4. The milk frothing head according to claim 1, wherein the at least one filter screen is made of stainless steel.

5. The milk frothing head according to claim 4, wherein the head end of the at least one filter screen is welded to the tail end of the at least one filter screen.

6. The milk frothing head according to claim 1, wherein a first positioning sheet is disposed on the at least one filter screen, and a first positioning groove matched with the first positioning sheet is defined in the first frothing frame or the second frothing frame.

7. The milk frothing head according to claim 6, wherein at least one second positioning sheet is disposed on the at least one filter screen, the at least one second positioning sheet is disposed opposite to the first positioning sheet, a second positioning groove matched with the at least one second positioning sheet is defined in the first frothing frame or the second frothing frame.

8. The milk frothing head according to claim 1, wherein the at least one filter screen comprises filter screens, the filter screens are disposed layer by layer in a direction from an inside to an outside of the milk frothing head.

9. A frother, comprising:

a frothing motor;

a transmission shaft; and a milk frothing head;

wherein the milk frothing head comprises a first frothing frame and a second frothing frame, the first frothing frame is detachably connected to the second frothing frame, a connecting rod is disposed on one end of the first frothing frame, at least one filter screen is mounted between the first frothing frame and the second frothing frame, a head end of the at least one filter screen is connected to a tail end of the at least one filter screen, the at least one filter screen is of a ring shape, the first frothing frame defines a first through hole, and the second frothing frame defines a second through hole corresponding to the first through hole;

wherein a first end of the transmission shaft is connected to the connecting rod, and a second end of the transmission shaft is connected to an output shaft of the frothing motor.

10. The frother according to claim 9, wherein the transmission shaft is a hollow shaft, and a shock absorber configured to reduce vibration of the transmission shaft is mounted in the transmission shaft.

11. The frother according to claim 9, wherein at least one first frothing block is disposed on the first frothing frame, at least one second frothing block is disposed on the second frothing frame, and the at least one first frothing block and the at least one second frothing block are configured to refine milk foam.

* * * * *